United States Patent
Yao et al.

(10) Patent No.: US 9,870,475 B2
(45) Date of Patent: Jan. 16, 2018

(54) HARDWARE CONFIGURATION REPORTING SYSTEMS

(71) Applicant: Intel Corporation, Santa Clara, CA (US)

(72) Inventors: Jiewen Yao, Shanghai (CN); Vincent J. Zimmer, Federal Way, WA (US); Brian S. Payne, Portland, OR (US); Nicholas J. Adams, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 16 days.

(21) Appl. No.: 14/778,000

(22) PCT Filed: Jun. 25, 2014

(86) PCT No.: PCT/CN2014/080689
§ 371 (c)(1),
(2) Date: Sep. 17, 2015

(87) PCT Pub. No.: WO2015/196381
PCT Pub. Date: Dec. 30, 2015

(65) Prior Publication Data
US 2016/0292423 A1    Oct. 6, 2016

(51) Int. Cl.
*G06F 21/44* (2013.01)
*G06F 21/57* (2013.01)
*G06F 21/53* (2013.01)

(52) U.S. Cl.
CPC ............ *G06F 21/577* (2013.01); *G06F 21/53* (2013.01)

(58) Field of Classification Search
CPC ...................................................... G06F 21/44
See application file for complete search history.

(56) References Cited

U.S. PATENT DOCUMENTS

| 2014/0075496 A1 | 3/2014 | Prakash et al. |
| 2014/0754961 | 3/2014 | Prakash et al. |

(Continued)

FOREIGN PATENT DOCUMENTS

| CN | 102509046 A | 6/2012 |
| KR | 10-2014-0114263 A | 9/2014 |

OTHER PUBLICATIONS

International Search Report and Written Opinion dated Mar. 27, 2015 for International Application No. PCT/CN2014/080689, 12 pages.

(Continued)

*Primary Examiner* — Josnel Jeudy
(74) *Attorney, Agent, or Firm* — Schwabe, Williamson & Wyatt, P.C.

(57) ABSTRACT

Embodiments related to hardware configuration reporting and arbitration are disclosed herein. For example, an apparatus for hardware configuration reporting may include: a processing device having a trusted execution environment (TEE) and a non-trusted execution environment (non-TEE); request service logic, stored in the memory, to operate within the TEE to receive an indication of a request from arbiter logic, wherein the request represents a hardware configuration register; and reporting logic, stored in the memory, to operate within the TEE and to report an indicator of a value of the hardware configuration register represented by the request to the arbiter logic. Other embodiments may be disclosed and/or claimed.

24 Claims, 5 Drawing Sheets

(56) References Cited

U.S. PATENT DOCUMENTS

| | | | |
|---|---|---|---|
| 2014/0095918 A1 | 4/2014 | Staahl et al. | |
| 2014/0143849 A1* | 5/2014 | Anderson | H04L 63/0263 726/11 |
| 2014/0283006 A1* | 9/2014 | Korkishko | G06F 21/53 726/16 |
| 2014/0298026 A1* | 10/2014 | Isozaki | H04L 9/0825 713/171 |

OTHER PUBLICATIONS

Office Action dated Oct. 30, 2017 for Korean Patent Application No. 10-2016-7032897, 7 pages.

* cited by examiner

HARDWARE CONFIGURATION REPORTING SYSTEMS

CROSS REFERENCE TO RELATED APPLICATIONS

The present application is a national phase entry under 35 U.S.C. § 371 of International Application No. PCT/CN2014/080689, filed Jun. 25, 2014, entitled "HARDWARE CONFIGURATION REPORTING SYSTEMS", which designated, among the various States, the United States of America. The Specification of the PCT/CN2014/080689 Application is hereby fully incorporated by reference.

TECHNICAL FIELD

The present disclosure relates to computing apparatuses, and more particularly, to hardware configuration reporting.

BACKGROUND

The values of hardware configuration registers used during boot-up are typically initially manually configured by a boot engineer. Consequently, proper configuration is subject to human error, and mistakes in manual configuration may often go undetected.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
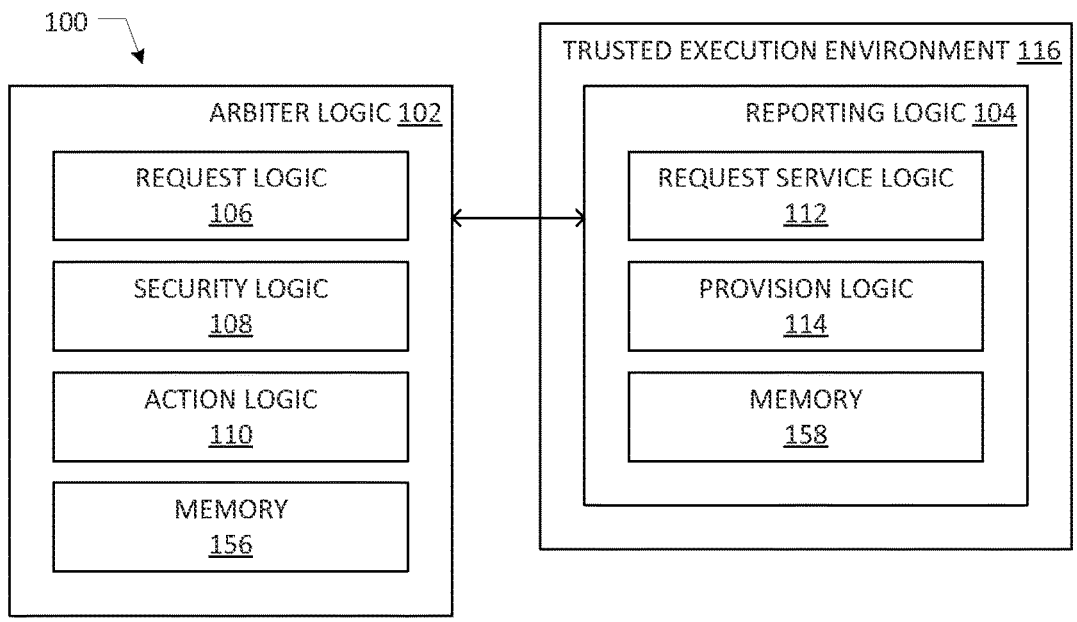
FIG. 1 is a block diagram of a hardware configuration reporting system, in accordance with various embodiments.

Embodiments related to hardware configuration reporting and arbitration are disclosed herein. For example, an apparatus for hardware configuration reporting may include: a processing device having a trusted execution environment (TEE) and a non-trusted execution environment (non-TEE); request service logic, stored in the memory, to operate within the TEE to receive an indication of a request from arbiter logic, wherein the request represents a hardware configuration register; and reporting logic, stored in the memory, to operate within the TEE and to report an indicator of a value of the hardware configuration register represented by the request to the arbiter logic.

As observed above, engineers responsible for the start-up operations of a computing apparatus may inadvertently or deliberately fail to properly set certain hardware configuration registers (which often number forty or more). These errors may be extremely costly; if a register corresponding to an access permission is left "open" (i.e., not locked to tampering), malicious code may take advantage of the open door and make changes that have the potential to affect all subsequent performance. For example, if a flash part lock register is left unlocked, the read-only memory (ROM) on a motherboard may be left open for rewriting by malicious code. During boot, a chipset memory map may direct a central processing unit (CPU) to the flash part to execute the first instructions. If these instructions have been maliciously changed, the CPU may execute the malicious code before any other protections are in place.

Various embodiments of the hardware configuration reporting systems and techniques disclosed herein may enable the detection of such errors during boot and/or runtime, and may enable the apparatus to take actions to mitigate or alert a user to the security risk. In some embodiments, an administrator or other authorized entity may use the hardware configuration reporting systems and techniques disclosed herein to get and review hardware configuration information, and decide on next steps (e.g., in accordance with a predefined security policy).

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description uses the phrases "in an embodiment," or "in embodiments," which may each refer to one or more of the same or different embodiments. Furthermore, the terms "comprising," "including," "having," and the like, as used with respect to embodiments of the present disclosure, are synonymous. As used herein, the term "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 is a block diagram of a hardware configuration reporting system 100, in accordance with various embodiments. The hardware configuration reporting system 100 may be implemented in an apparatus (such as the apparatus 900 discussed below with reference to FIG. 9) having a processing device that can operate in a trusted execution environment (TEE) 116 or in one or more non-trusted execution environments (non-TEEs) 118 (illustrated in FIG. 2). A memory storing logic to be executed when the processing device is in the TEE 116 (referred to as TEE memory) may be isolated from a memory storing logic to be executed when the processing device is in a non-TEE 118 such that logic operative when the processing device is in the non-TEE 118 cannot access the TEE memory. The processing device may be configured to transition between the TEE 116 and the non-TEE 118 in response to an interrupt.

In some embodiments, the TEE 116 may be a system management mode (SMM) of the processing device. An SMM is a processing device mode often used for managing low-level operations, such as a power control and thermal regulation. The SMM may have its own hidden memory space and execution environment that is not visible or accessible to logic operating outside the SMM. In some embodiments, the SMM may be installed by a basic input/output operating system (BIOS) of the apparatus, and may be entered when the processing device receives a system management interrupt (SMI); upon detection of an SMI, the working memory of the non-SMM may be stored for later reinstantiation, and the processing device may enter the SMM. Embodiments discussed herein with reference to a BIOS may be implemented analogously with reference to a Unified Extensible Firmware Interface (UEFI).

The hardware configuration reporting system 100 may include arbiter logic 102 and reporting logic 104. The reporting logic 104 may be operable from the TEE, and may be isolated from logic executed when the processing device is in the non-TEE 118. In particular, the reporting logic 104 may be stored in the TEE memory. As discussed below with reference to FIG. 2, the arbiter logic 102 may operate within the TEE 116 or within a non-TEE 118. The arbiter logic 102 may be communicatively coupled with the reporting logic 104.

The arbiter logic 102 may include request logic 106, security logic 108, and action logic 110. The arbiter logic 102 may also include a memory 156, which may be utilized by any of the components of the arbiter logic 102 to store data relevant to the operation of the arbiter logic 102.

The request logic 106 may be configured to provide an indication of a request to the reporting logic 104. The request may represent one or more hardware configuration registers about which the arbiter logic 102 wishes to receive information. The hardware configuration reporting system 100 may recognize one or more different types of requests. In some embodiments, the request may be a "query" of a value of one or more hardware configuration registers, in response to which the reporting logic 104 may provide an indicator of the values. For example, a request provided by the request logic 106 to the reporting logic 104 may be a query representative of a flash part lock register; in response, the reporting logic 104 may provide an indication of whether a value of "0" or a value of "1" is stored in the flash part lock register. One value may indicate that the flash part is locked, and thus the motherboard ROM cannot be updated, while another value may indicate that the flash part is unlocked, and thus that the motherboard ROM can be updated by anyone. In some embodiments, the request may be a "check" that a value of one or more hardware configuration registers is equal to a set of specified values, in response to which the reporting logic 104 may provide a binary indicator of whether or not the values of the hardware configuration registers are equal to the set of specified values. For example, a request provided by the request logic 106 to the reporting logic 104 may be a check representative of a flash part lock register and the specified value of "1"; in response, the reporting logic 104 may provide an indication that the value stored in the flash part lock register is equal to the specified value of "1," or is not equal to the specified value of "1." In some embodiments in which an apparatus includes an SMM, a request provided by the request logic 106 to the reporting logic 104 may be a check or query representative of an SMM lock register. One value may indicate that the SMM memory cannot be updated, while another value may indicate that the SMM memory is unlocked and thus that it can be updated by anyone. In some embodiments, the arbiter logic 102 may be configured to selectively provide query and check requests, while in other embodiments, the arbiter logic 102 may be limited to providing only query or only check requests.

In some embodiments, the form and content of the request provided by the request logic 106 may be configured by a developer. For example, a developer may write an Extensible Markup Language (XML) script, specifying the form and content of a request (e.g., the hardware configuration registers to be represented by the request and the type of request) and may store that script in the memory 156. The request logic 106 may be configured to retrieve the XML script from the memory 156 and convert the XML script into a binary script for execution. The request logic 106 may be configured to store the binary script. When the request logic 106 executes the binary script, a request may be provided to the reporting logic 104.

The security logic 108 may be coupled with the request logic 106 and may be configured to evaluate an indicator provided by the reporting logic 104 in response to receipt of the indication of the request from the request logic 106. In particular, the security logic 108 may be configured to determine that an indicator of a value of the hardware configuration register (represented by the request provided by the request logic 106) does or does not satisfy a stored security requirement. The stored security requirement may be a part of a predefined security policy set by an administrator or other authorized entity. One or more security requirements may be stored in the memory 156, and may correspond with particular individual values or patterns of values of various hardware configuration registers (e.g., in any suitable database structure). For example, a security requirement stored in the memory 156 may specify that a value of a chipset remapping register must be "1," indicating that the chipset remapping register is locked and cannot be tampered with. A value of "0" may indicate that anyone can remap portions of the memory (e.g., remapping hidden portions of memory, such as those corresponding to the TEE 116, to unprotected memory areas). The security logic 108 may be configured to determine that an indicator of the value of the chipset remapping register is either equal to "1" or not, based on the indicator provided by the reporting logic 104 in response to the request of the request logic 106.

The action logic 110 may be coupled with the security logic 108 and may be configured to perform an action in response to a determination by the security logic 108 that its stored security requirement is or is not satisfied. The actions to be taken when various stored security requirements are or are not satisfied may be stored in the memory 156 such that each possible result of the determination by the security logic 108 may be stored in correspondence with one or more actions to be taken (e.g., in any suitable database structure). The action logic 110 may locate the particular result of the determination by the security logic 108 in the memory 156, identify the corresponding one or more actions, and may perform the corresponding one or more actions. The actions to be taken may be selected by a device designer so that the hardware configuration reporting system 100 is not compromised. For example, in some embodiments, the action logic 110 may be configured to cause the display, on the display device coupled with the hardware configuration reporting system 100, of an indicator that the stored security requirement is or is not satisfied. This indicator may be part of a graphical user interface, and may notify a user of the status of the security requirement. In some embodiments, the action logic 110 may be configured to cause hardware associated with the hardware configuration register to shut down in response to a determination (by the security logic 108) that the stored security requirement is not satisfied. For example, if the hardware configuration register is associated with parallel communication hardware, the action logic 110 may cause the parallel communication hardware to shut down temporarily or suspend operations if the stored security requirement for the parallel communication hardware is not satisfied. These actions are simply illustrative, and any suitable actions may be taken.

The reporting logic 104 may include request service logic 112 and provision logic 114. The reporting logic 104 may also include a memory 158 that may be utilized by any of the components of the reporting logic 104 to store data relevant to the operation of the reporting logic 104. As discussed above with reference to the arbiter logic 102, the reporting logic 104 may be configured to operate within the TEE 116 to receive and respond to an indication of a request from the arbiter logic 102. In particular, the request service logic 112 (stored in the TEE memory) may be configured to operate within the TEE 116 to receive the indication of the request from the arbiter logic 102 (e.g., from the request logic 106). The request may represent one or more hardware configuration registers.

The provision logic 114 (stored in the TEE memory) may be coupled to the request service logic 112 and may be configured to operate within the TEE 116 to provide an indicator, to the arbiter logic 102 (e.g., to the security logic 108), of a value of the hardware configuration register represented by the request.

Figure 2:
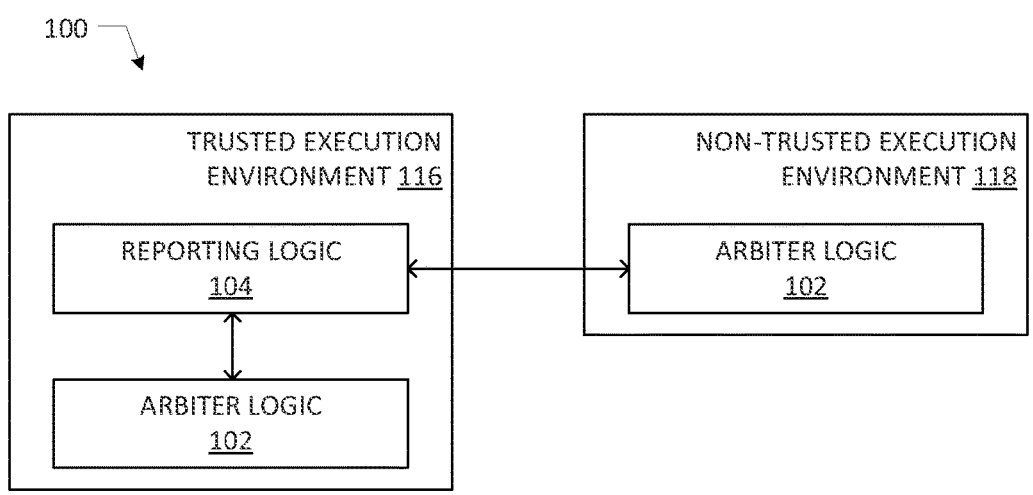
FIG. 2 is a block diagram of a hardware configuration reporting system having one or more instantiations of arbiter logic, in accordance with various embodiments.

As noted above, the arbiter logic 102 may be operable from within the TEE 116 or the non-TEE 118. In some embodiments, one or more instantiations of the arbiter logic 102 may operate within the TEE 116 and one or more instantiations of the arbiter logic 102 may operate in the non-TEE 118. FIG. 2 illustrates such an embodiment of the hardware configuration reporting system 100. The instantiation of the arbiter logic 102 in the TEE 116 may be, for example, a basic input/output operating system (BIOS) phase arbiter that may execute at boot to evaluate the values of various hardware configuration registers during boot. In some embodiments, the BIOS phase arbiter may provide a check request to check that the values of various hardware configuration registers are in accordance with stored security requirements; if not, the BIOS phase arbiter may prevent the apparatus from booting. The instantiation of the arbiter logic 102 in the non-TEE 118 may be, for example, a security console application that runs within an operating system to evaluate the values of various hardware configuration registers during operation (e.g., periodically or at the command of an administrator). In some embodiments, the non-TEE 118 may operate on a processing device that is different from a processing device on which the reporting logic 104 operates, and thus the arbiter logic 102 may operate on a processing device different from the processing device on which the reporting logic 104 operates. In some embodiments, the non-TEE 118 may operate on a same processing device as a processing device on which the reporting logic 104 operates.

In some embodiments in which the arbiter logic 102 is included in an application operating within the non-TEE 118 of the same processing device in which the reporting logic 104 is instantiated, the hardware configuration reporting system 100 may establish an "in-band" trusted channel between the reporting logic 104 and the arbiter logic 102. As noted above, the application may be a security console, policy orchestrator, security driver, or other security-related middleware. A security console may be configured to provide a visual display to a user of the results of any hardware configuration register requests, in response to instructions from the action logic 110. In some embodiments, this visual indicator may take the form of a "pass/fail" indicator. In embodiments in which the user is an administrator and would like more detailed results, the security console may provide a visual indicator of the values of each hardware configuration register represented by a request, in response to instructions from the action logic 110.

In some embodiments in which the arbiter logic 102 is included in an application operating within the non-TEE 118 of a different processing device than the one in which the reporting logic 104 is instantiated, the hardware configuration reporting system 100 may establish an "out-of-band" trusted channel between the reporting logic 104 and the arbiter logic 102. In some such embodiments, the arbiter logic 102 may be instantiated in a Manageability Engine (ME), Converged Security and Manageability Engine (CSME), or Active Management Technology (AMT).

Figure 3:
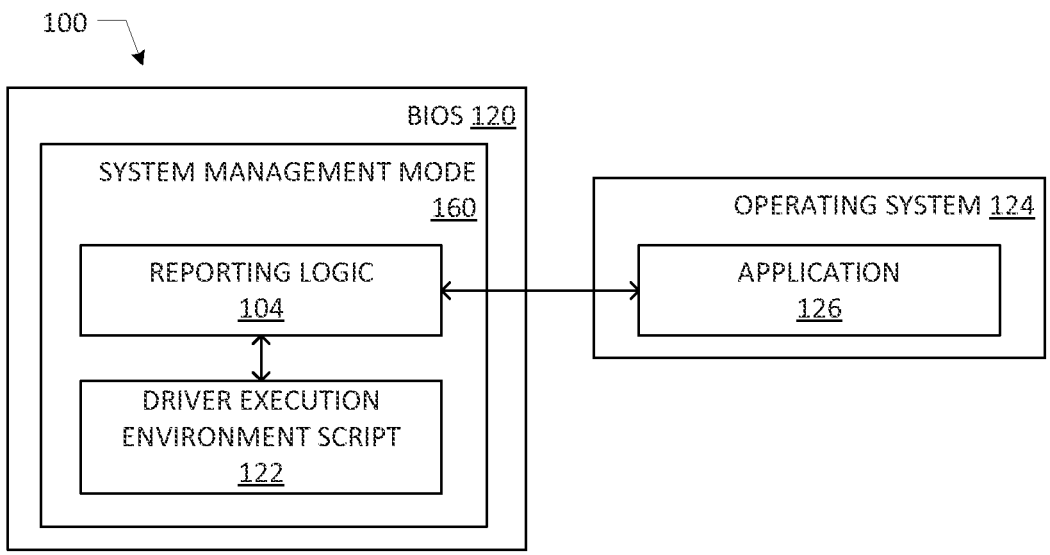
FIG. 3 is a block diagram of a hardware configuration reporting system having a system management mode as the trusted execution environment, in accordance with various embodiments.

As noted above, in some embodiments, the TEE 116 may be an SMM, and the TEE memory may be an SMM memory (e.g., system management random access memory or SMRAM). FIG. 3 illustrates such an embodiment of the hardware configuration reporting system 100. In the embodiment of FIG. 3, the SMM 160 may serve as the TEE 116, and the reporting logic 104 may operate within the SMM 160. The BIOS 120 may include the SMM 160, and may also include one or more driver execution environment (DXE) scripts 122. The one or more DXE scripts 122 may serve as the arbiter logic 102 included in the TEE 116 in the embodiment of the hardware configuration reporting system 100 of FIG. 2. Thus, a DXE script 122 may provide an indicator of a request representative of a hardware configuration register to the reporting logic 104 (e.g., during boot) and the reporting logic 104 may respond accordingly. The operating system 124 may serve as the non-TEE 118, and may include one or more applications 126 to serve as the arbiter logic 102 included in the non-TEE 118 (e.g., as shown in FIG. 2). The one or more applications 126 may be communicatively coupled with the reporting logic 104 of the SMM 160 to perform the hardware configuration register request and response operations disclosed herein. For example, an application 126 may provide an indicator of a request representative of a hardware configuration register to the reporting logic 104 and the reporting logic 104 may respond accordingly. In embodiments in which the processing device on which the operating system 124 operates is the same as the processing device on which the BIOS 120 operates, the indicator of the request may be accompanied by a system management interrupt to cause the processing device to enter the SMM 160, upon which the indicator of the request may be processed by the reporting logic 104.

Other potential candidates for the TEE 116 may not be configurable with reporting logic having the functionality described herein. For example, a Trusted Platform Module (TPM) does not typically record all chipset register settings, and instead, typically only compares current operating system configuration information to previous operating system configuration information in order to detect changes in such information. However, a TPM is typically unable to provide actual values of hardware configuration registers, as described above with reference to the reporting logic 104. Another candidate, a virtual machine monitor (VMM), is unable to access a number of hardware configuration registers (e.g., SMM-related hardware configuration registers), and is typically generic to different platforms and thus unable to perform platform-specific queries.

Embodiments in which the SMM 160 serves as the TEE 116 may have various advantages. The SMM 160 may have higher level privileges for accessing hardware registers than are allocated to other modes (e.g., those in which an operating system runs). In some embodiments, when in the SMM 160, the processing device may be able to read any disk part, and thus may have full access to system resources. As discussed above, the SMM 160 is an isolated execution environment, and thus the code and data stored in the SMM memory may not be visible to an operating system kernel or applications running in the operating system. Since the SMM 160 is entered via an interrupt, the SMM 160 provides a trigger-response mechanism for hardware reporting, and can serve requests from external sources (e.g., from arbiter logic 102 outside of the SMM 160). Additionally, the SMM 160 is also integrated into the platform firmware, and shipped as a component of the platform hardware, making it difficult for a malicious user to remove or tamper with it.

In some embodiments, the indicator of the request from the arbiter logic 102 may be based at least in part on a source of an interrupt that triggers the entry of the processing device into the TEE 116. For example, if an application in the non-TEE 118 accesses a designated input/output (I/O) port, an interrupt may be triggered for the processing device to enter the TEE 116. The memory 158 may store the locations of various I/O ports; when an interrupt is triggered by an access to those ports, that interrupt indicates a request from the arbiter logic 102. In some embodiments, the particular I/O port may correspond to a particular type of request (e.g., a check or a query).

In some embodiments, the indicator of the request from the arbiter logic 102 may be based at least in part on a value stored in a predetermined register accessible to the processing device when operating in the non-TEE 118. For example, a particular hardware register (e.g., an I/O port) may be designated to be programmed with a particular value by the arbiter logic 102 as the indicator of the request. When an interrupt is detected to cause the processing device to enter the TEE 116, the reporting logic 104 may be configured to read the value of the particular hardware register. In some embodiments, this hardware register is a same register whose access triggered the interrupt to cause the processing device to enter the TEE 116, as discussed above. Different values of the particular hardware register may correspond to different types of requests (e.g., checks or queries) and different hardware configuration registers represented by the request indicator. The correspondence between the values of the particular hardware register and the types and/or hardware configuration registers of the request may be stored in the memory 158 and accessed by the reporting logic 104. In some embodiments, a general purpose register may be designated to be programmed with a particular value by the arbiter logic 102 that may act as a parameter to be passed to the reporting logic 104. Any suitable parameter may be communicated via the general purpose register (e.g., a specific memory location to which the reporting logic 104 is to provide the result of the query or check). In some embodiments, the location of this general purpose register may be stored in the memory 158, and the reporting logic 104 may be configured to look in this general purpose register upon receiving a request.

Figure 4:
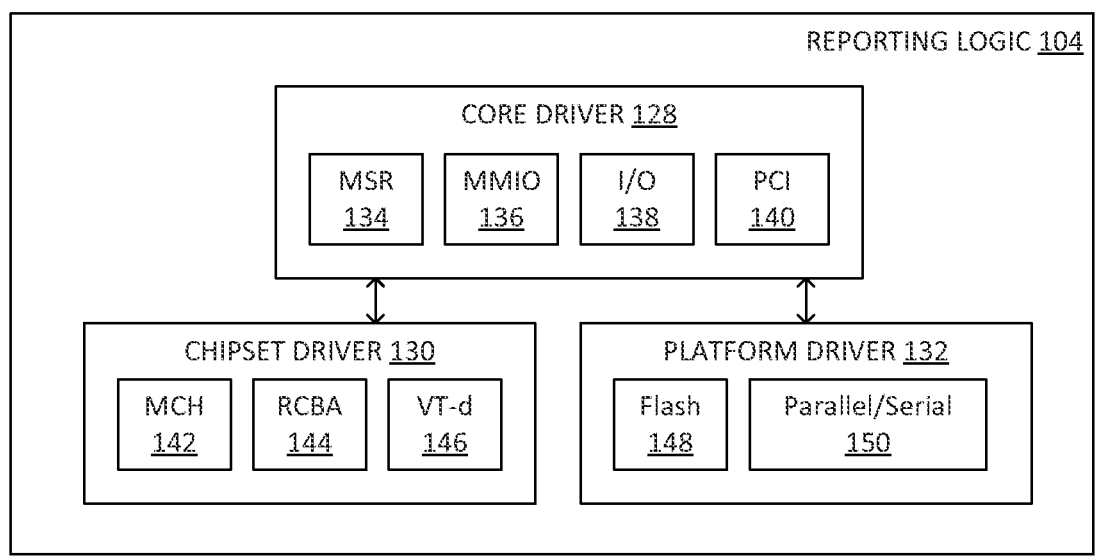
FIG. 4 is a block diagram of reporting logic including multiple drivers, in accordance with various embodiments.

FIG. 4 illustrates an embodiment of the reporting logic 104 in which the functionality of the request service logic 112, the provision logic 114, and the memory 158 are distributed among multiple drivers. Different ones of the drivers may have access to different hardware configuration registers, and thus requests representative of different hardware configuration registers may be at least partially serviced by different drivers. FIG. 4 illustrates an embodiment in which the reporting logic 104 includes a core driver 128, a chipset driver 130, and a platform driver 132.

The core driver 128 may be a generic chipset common to many apparatuses (e.g., many apparatuses produced by a single manufacturer). Requests received at the reporting logic 104 may be received at the core driver 128, which may be configured to determine which of the drivers of the reporting logic 104 (e.g., the core driver 128, chipset driver 130, or the platform driver 132) has access to the hardware configuration register represented by the request. The core driver 128 may then communicate with the determined driver to service the request. For example, the core driver 128 may route the request to the chipset driver 130 or the platform driver 132 (if the core driver 128 does not service the request itself), the chipset driver 130 or the platform driver 132 may access the hardware configuration register to respond to the request, and the chipset driver 130 or the platform driver 132 may return the response to the core driver 128 for providing to the arbiter logic 102.

In some embodiments, the core driver 128 may have access to basic system resource hardware configuration registers, such as a system management range register (which may determine how SM RAM is cached), model-specific registers (MSR) 134 (used for various debugging and performance monitoring tasks), peripheral component interconnect (PCI) registers 140, memory-mapped I/O (MMIO) registers 136, and I/O registers 138. For example, the core driver 128 may be configured to access the system management range register and return data (in response to a query) that includes the value of the system management range register and the data type configuration of the system management range register (e.g., that the system management range register is configured as an 8M aligned address).

In some embodiments, the chipset driver 130 may have access to chipset resource hardware configuration registers, such as memory controller hub (MCH) registers 142 (for chipset remapping), registers related to direct memory access (such as VT-d registers 146), and root complex base address (RCBA) registers 144 (such as the RCBA.TOP_SWAP register for providing a back-up boot block).

In some embodiments, the platform driver 132 may have access to platform resource hardware configuration registers, such as the flash part lock registers 148, embedded controller registers, parallel and serial communication registers 150, and registers related to a keyboard, mouse or other peripherals.

Figure 5:
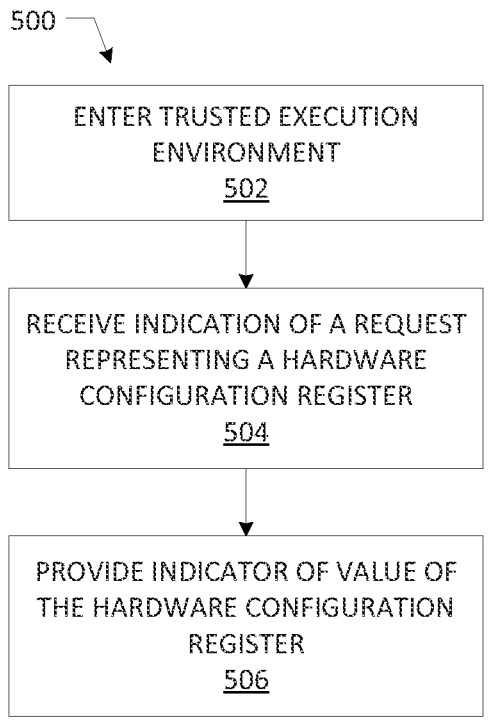
FIG. 5 is a flow diagram of a method for hardware configuration reporting, in accordance with various embodiments.

FIG. 5 is a flow diagram of a method 500 for hardware configuration reporting, in accordance with various embodiments. Although the operations of the method 500 may be discussed as performed by a processing device having the TEE 116 configured with the reporting logic 104, this is simply for illustrative purposes and these operations may be performed by any suitable hardware. Any of the operations discussed below with reference to the method 500 may be performed in accordance with any of the embodiments discussed above with reference to the hardware configuration reporting system 100.

At 502, the processing device may enter the TEE 116 (e.g., from the non-TEE 118). The processing device may enter the TEE 116 in response to receiving an interrupt. For example, when the TEE 116 is the SMM 160, the processing device may enter the SMM 160 in response to a system management interrupt.

At 504, the processing device (operating in the TEE 116) may receive an indication of a request representing a hardware configuration register. In some embodiments, the request service logic 112 of the reporting logic 104 may receive a request.

At 506, the processing device (operating in the TEE 116) may provide an indicator of a value of the hardware configuration register represented in the request of 504. In some embodiments, the provision logic 114 of the reporting logic 104 may provide the indicator.

Figure 6:
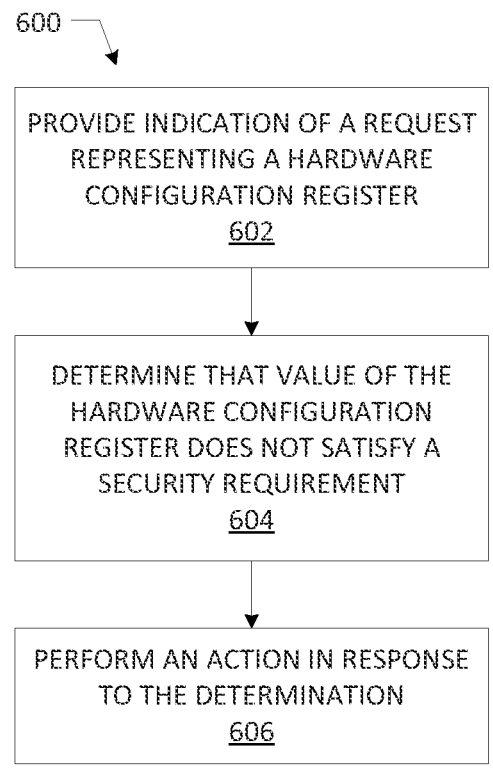
FIG. 6 is a flow diagram of a method for hardware configuration arbitration, in accordance with various embodiments.

FIG. 6 is a flow diagram of a method 600 for hardware configuration arbitration, in accordance with various embodiments. Although the operations of the method 600 may be discussed as performed by a processing device configured with the arbiter logic 102, this is simply for illustrative purposes and these operations may be performed by any suitable hardware. Any of the operations discussed below with reference to the method 600 may be performed in accordance with any of the embodiments discussed above with reference to the hardware configuration reporting system 100.

At 602, the processing device may provide an indication of a request, representing a hardware configuration register, to reporting logic located in a TEE (e.g., the reporting logic 104 located in the TEE 116) of a processing device. In some embodiments, the request logic 106 may provide the indication of the request at 602. In some embodiments, the indication of the request may be provided by arbiter logic 102 operating in the same TEE of the processing device that receives the request. In some embodiments, the indication of the request may be provided by arbiter logic 102 operating in a non-TEE of the processing device that receives the request. In some embodiments, the processing device that provides the indication of the request may be a different processing device than the one that receives the request. In some embodiments, the TEE may be an SMM.

At 604, the processing device may determine that a value of the hardware configuration register, provided by the reporting logic in response to the request, does not satisfy a security requirement. In some embodiments, the security logic 108 may perform the determination of 604.

At 606, the processing device may perform an action in response to the determination that the security requirement is not satisfied. In some embodiments, the action logic 110 may perform the action of 606. Although a determination that the security requirement is not satisfied was discussed above with reference to 604 and 606, a determination that the security requirement is satisfied may be performed, and actions may be taken accordingly (e.g., as discussed above with reference to the action logic 110).

Figure 7:
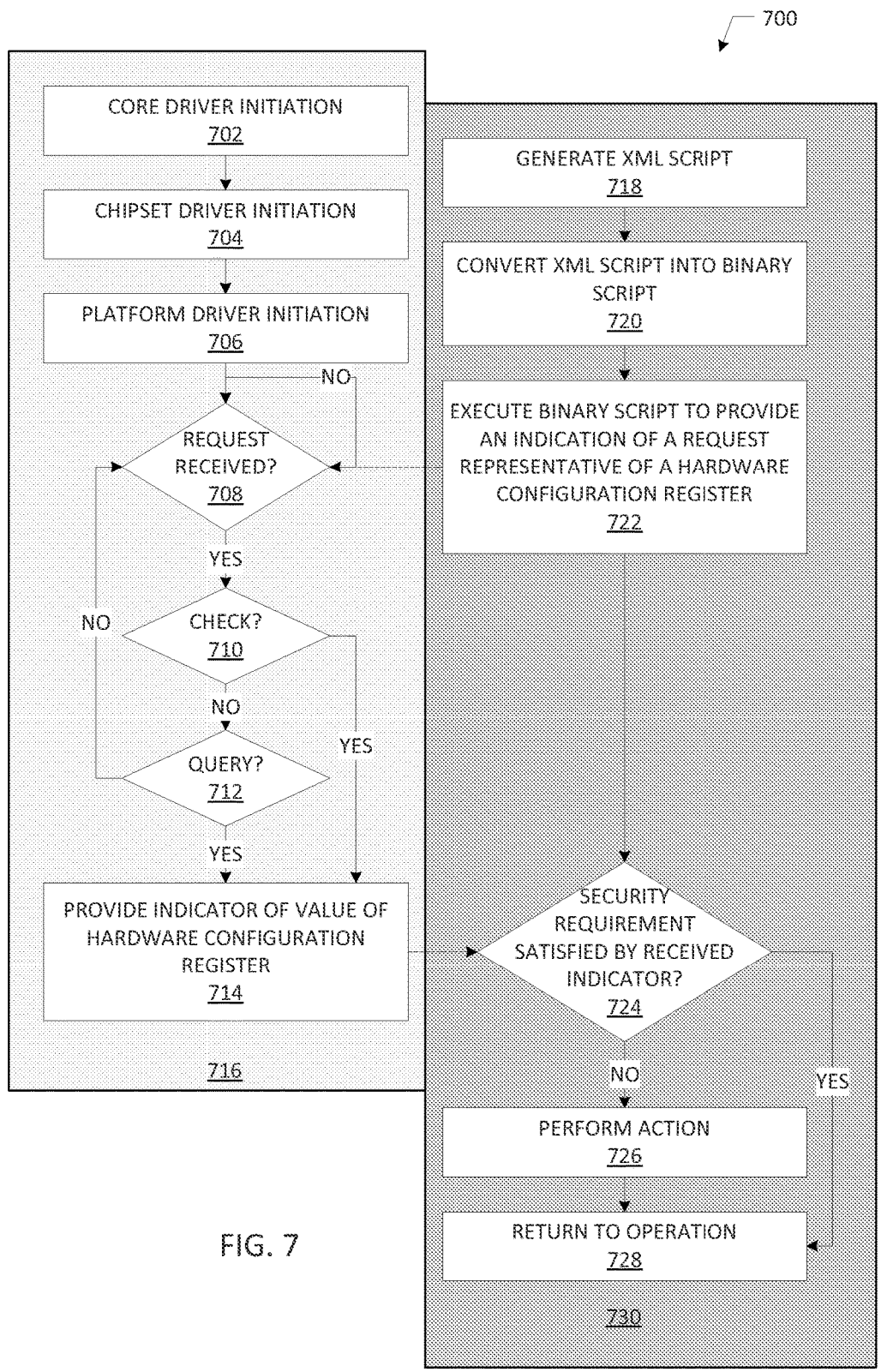
FIG. 7 is a flow diagram of a method for hardware configuration reporting and arbitration, in accordance with various embodiments.

FIG. 7 is a flow diagram of a method 700 for hardware configuration reporting and arbitration, in accordance with various embodiments. The method 700 may include embodiments of various ones of the operations of the method 500 (FIG. 5) and the method 600 (FIG. 6). In particular, the method 700 includes reporting operations 716 and arbitration operations 730. The reporting operations 716 and the arbitration operations 730 may be performed by different logic. For example, in some embodiments, the reporting operations 716 may be performed by the reporting logic 104 and the arbitration operations 730 may be performed by the arbiter logic 102. Although the operations of the method 700 may be discussed as variously performed by the reporting logic 104 of FIG. 4 and the arbiter logic 102 of FIG. 1, this is simply for illustrative purposes and these operations may be performed by any suitable hardware. Any of the operations discussed below with reference to the method 700 may be performed in accordance with any of the embodiments discussed above with reference to the hardware configuration reporting system 100.

At 702, a core driver, included in reporting logic, may be initiated. The core driver of 702 may be the core driver 128 discussed above with reference to FIG. 4. In some embodiments, initiation may include the invocation of a driver entry point. The driver (e.g., the core driver 128) may prepare its own data structure in memory, and data in that data structure may be utilized at a later time. In some embodiments, initiation may include registering one or more protocols or callback functions that may be called by other drivers later. For example, a chipset driver (e.g., as discussed below) may register a ChipsetCheck( ) and a ChipsetReport( ) function for use by the core driver. When the core driver gets a corresponding function request (e.g., from the BIOS or an OS), the core driver may dispatch the request to the appropriate chipset driver function.

At 704, a chipset driver, included in reporting logic, may be initiated. The chipset driver of 704 may be the chipset driver 130 discussed above with reference to FIG. 4.

At 706, a platform driver, included in reporting logic, may be initiated. The platform driver of 706 may be the platform driver 132 discussed above with reference to FIG. 4.

At 708, the reporting logic may determine whether a request has been received. As discussed above, a request may represent one or more hardware configuration registers about which the provider of the request (e.g., the arbiter logic 102) wishes to receive information. In some embodiments, the determination of 708 may be performed by the core driver 128. If the reporting logic determines that no request has been received, the reporting logic may return to 708 and continue to monitor for a request. As indicated by the dotted arrow 732 in FIG. 7, the request may be provided by arbiter logic in response to performing the operations of 722 (discussed below).

If the reporting logic determines that a request has been received at 708, the reporting logic may proceed to 710 to determine whether the request is a check. As discussed above with reference to the request logic 106, a check request may ask whether a value of one or more hardware configuration registers is equal to a set of specified values. In some embodiments, the determination of 710 may be performed by the core driver 128. If the reporting logic determines at 710 that the request is not a check, the reporting logic may proceed to 712 to determine whether the request is a query. As discussed above with reference to the request logic 106, a query may ask for the value of one or more hardware configuration registers. In some embodiments, the determination of 712 may be performed by the core driver 128. If the reporting logic determines at 712 that the request is not a query, and there are no other request types permitted, the reporting logic may return to 708 and continue to monitor for the receipt of a valid request.

If the reporting logic determines that the request is a check at 710, or determines that the request is a query a 712, reporting logic may proceed to 714 to provide an indicator of the value of one or more hardware configuration registers represented by the request. In some embodiments, the core driver 128 may determine that another of the drivers included in the reporting logic 104 (e.g., the chipset driver 130 or the platform driver 132) has access to a hardware configuration register represented in the request, and may route the request to the determined driver and communicate with the determined driver to receive the response to the check or query, as appropriate. In some embodiments, the core driver of 702 may provide the indicator of the value of the one or more hardware configuration registers. The indicator of the value of the one or more hardware configuration registers may be provided to, for example, arbiter logic (e.g., the arbiter logic 102). As indicated by the dotted arrow 734 in FIG. 7, the indicator of the value may be provided to arbiter logic.

Turning to the operations 730 of the method 700, at 718, an XML script may be generated. As discussed above with reference to the request logic 106, the XML script may be generated by a developer or may be automatically generated (e.g., by the request logic 106). Since XML uses a syntax readily understood by developers, an XML script may allow a developer to readily define an expected hardware configuration (e.g., in the form of one or more stored security requirements or other security policy). The XML script may specify the form and content of a particular request, and may be stored in the memory 156.

At 720, the XML script of 718 may be converted into a binary script. As discussed above with reference to the request logic 106, the binary script may be executable by the request logic 106 to provide an indication of a request to reporting logic (e.g., the reporting logic 104). In some embodiments, the binary script may be included in firmware and may be sent by the arbiter logic 102 to the reporting logic 104 during BIOS boot.

At 722, the binary script of 720 may be executed to provide an indication of a request to reporting logic (e.g., the reporting logic 104). The request may represent a hardware configuration register for which information is desired. In some embodiments, the request may be of a particular type recognized by the reporting logic (e.g., a check or query, as discussed above). As indicated by the dotted arrow 732 in FIG. 7, the request may be provided to reporting logic.

At 724, in response to receiving an indicator of a value of the hardware configuration register represented by the request (e.g., as indicated by the arrow 734), the receipt indicator may be evaluated to determine whether a stored security requirement is satisfied. In some embodiments, the security logic 108 may perform the operations of 724 in accordance with any of the embodiments discussed above.

If it is determined at 724 that any stored security requirements are satisfied, the arbiter logic may proceed to 728 and normal operation of the computing device associated with the hardware register represented by the request may resume. In some embodiments, one or more actions may be performed upon determination that any stored security requirements are satisfied (e.g., reporting the satisfaction of the stored security requirements on a display device). It is determined at 724 that any stored security requirements are not satisfied, the arbiter logic may proceed to 726 and an action may be performed. The action may be any security risk mitigation or other suitable action, as discussed above with reference to the action logic 110. In some embodiments, the action logic 110 may perform the action of 726.

Figure 8:
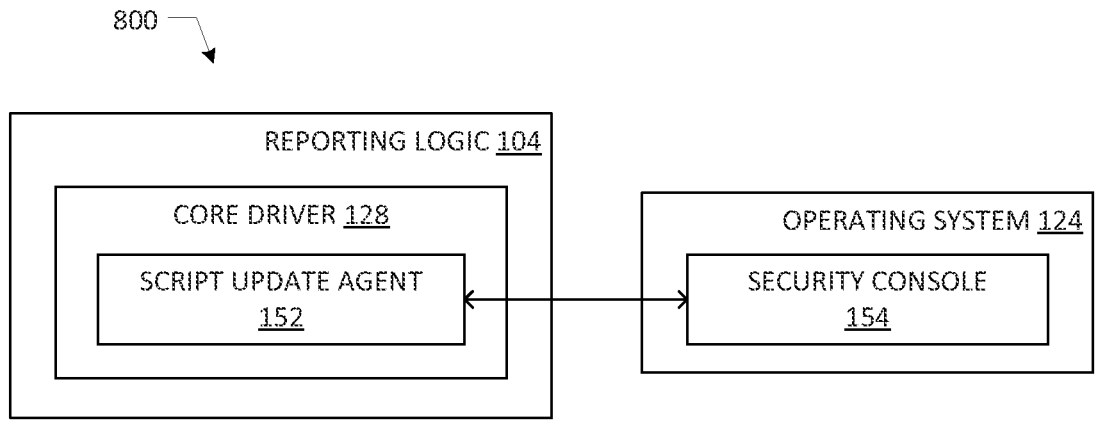
FIG. 8 is a block diagram of an updating system that may be included in a hardware configuration reporting system 100, in accordance with some embodiments.

In some embodiments, the hardware configuration reporting system 100 may include logic for updating its operations. FIG. 8 is a block diagram of an updating system 800 that may be included in the hardware configuration reporting system 100, in accordance with some embodiments. The updating system 800 includes a script update agent 152 in the core driver 128 of the reporting logic 104 (e.g., in accordance with the embodiment of the reporting logic 104 discussed above with reference to FIG. 4). The script update agent may be communicatively coupled with a security console 154 operating within the operating system 124. The security console 154 may be configured to query the reporting logic 104 for a version number or digital signature of the code underlying the reporting logic 104, and may determine whether this code is the latest version (or an acceptable version). Although a component operating outside the TEE 116 may not be able to directly view the memory of the TEE 116, the security console 154 may be configured to send a request to a handler of the TEE 116 to check the digital signature or version number. In some embodiments, the TEE 116 may be configured to request an updated image of the reporting logic 104 from a trusted source, and update the reporting logic 104 accordingly.

Figure 9:
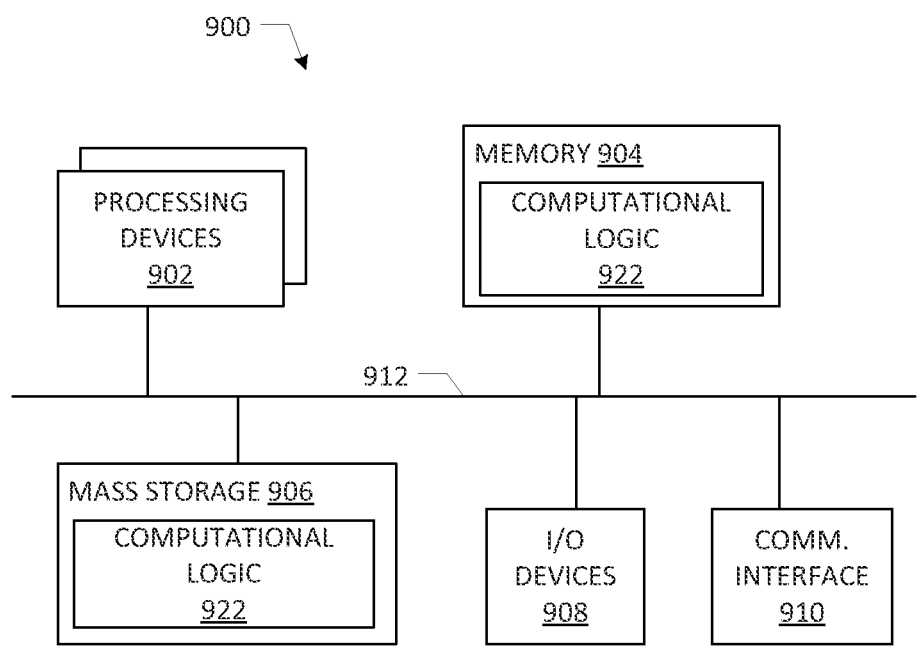
FIG. 9 is a block diagram of an example apparatus suitable for practicing various ones of the disclosed embodiments, in accordance with various embodiments.

Referring now to FIG. 9, a block diagram is provided of an example apparatus suitable for practicing the disclosed embodiments, in accordance with various embodiments. In various embodiments, the apparatus 900 may be a server, desktop computer, laptop computer, tablet computer, cell phone, smartphone, personal digital assistant, game console, Internet appliance, mobile Internet device or other computing device.

As shown, the apparatus 900 includes a number of processing devices 902, and a system memory 904. Any one or more of the processing devices 902 may be configured to include reporting logic (such as the reporting logic 104) and/or arbiter logic (such as the arbiter logic 102) as part of a hardware configuration reporting system (e.g., the hardware configuration reporting system 100). For example, one or more of the processing devices 902 may be configured to operate in a TEE and in one or more non-TEEs. In some embodiments, the TEE may be an SMM. Logic performing the function of any component of the hardware configuration reporting systems disclosed herein may be stored at least in part in the system memory 904 (which may be partitioned in accordance with the boundaries of the TEE). Additionally, the apparatus 900 may include mass storage devices 906 (such as diskette, hard drive, compact disc read-only memory (CD-ROM) and so forth), input/output devices 908 (such as display, keyboard, cursor control and so forth) and communication interfaces 910 (such as network interface cards, modems and so forth). The elements may be coupled to each other via system bus 912, which represents one or more buses. In the case of multiple buses, they may be bridged by one or more bus bridges (not shown).

Each of these elements may perform its conventional functions known in the art. In particular, the system memory 904 and the mass storage 906 may be employed to store a working copy and a permanent copy of the programming instructions implementing the method of any of FIGS. 5-7, or portions thereof, when executed by the respective processing devices 902, herein collectively denoted as computational logic 922. The various components may be implemented by assembler instructions supported by the processing devices 902 or high-level languages, such as, for example, C, that can be compiled into such instructions. The processing devices 902 and the system memory 904 may represent a broad range of processing device and memory arrangements including arrangements of processing cores of various execution speeds and power consumptions, and memory of various architectures (e.g., with one or more levels of caches) and various types (e.g., dynamic random access, FLASH, etc.). For example, the system memory 904 may include a TEE memory that is not accessible when a processing device 902 is operating in the non-TEE.

The permanent copy of the programming instructions may be placed into mass storage 906 in the factory, or in the field, through, for example, a machine-accessible distribution medium (not shown), such as a compact disc (CD), or through communication interface 910 (e.g., from a distribution server (not shown)). That is, one or more distribution media having an implementation of the agent program may be employed to distribute the agent program to various computing devices. In some embodiments, the reporting and/or arbiter logic may be updated in accordance with an updating mechanism (e.g., the reporting logic updating mechanism discussed above with reference to FIG. 8). The constitution of elements 902-912 is known, and accordingly will not be further described.

Machine-readable media (including non-transitory machine-readable media, such as machine-readable storage media), methods, systems and devices for performing the above-described techniques are illustrative examples of embodiments disclosed herein. Additionally, other devices in the above-described interactions may be configured to perform various disclosed techniques.

Various embodiments of the hardware configuration reporting systems disclosed herein may be used to provide hardware configuration and capability reporting for any number of apparatuses. For example, various embodiments may be used to provide BIOS integrity testing. Various embodiments may be used to provide hardware and firmware security state information.

The following paragraphs describe examples of various embodiments disclosed herein. Example 1 is an apparatus for hardware configuration reporting, including: a processing device having a TEE and a non-TEE, wherein the processing device is to enter the TEE from the non-TEE in response to a particular interrupt, and wherein the TEE is executed from a memory not accessible from the non-TEE; request service logic, stored in the memory, to operate within the TEE to receive an indication of a request from arbiter logic, wherein the request represents a hardware configuration register; and reporting logic, stored in the memory, to operate within the TEE and to report an indicator of a value of the hardware configuration register represented by the request to the arbiter logic.

Example 2 may include the subject matter of Example 1, and may further specify that the indication of the request from the arbiter logic is based at least in part on a value stored in a predetermined register accessible to the processing device when operating in the non-TEE.

Example 3 may include the subject matter of any of Examples 1-2, and may further specify that the indication of the request from the arbiter logic is based at least in part on a source of the particular interrupt that triggered the entry of the processing device into the TEE.

Example 4 may include the subject matter of any of Examples 1-3, and may further specify that the arbiter logic operates in the non-TEE of the processing device.

Example 5 may include the subject matter of any of Examples 1-3, and may further specify that the arbiter logic operates on a second processing device different from the processing device.

Example 6 may include the subject matter of any of Examples 1-3, and may further specify that the arbiter logic operates in the TEE of the processing device.

Example 7 may include the subject matter of any of Examples 1-6, and may further specify that the request is a query of a value of the hardware configuration register, and the indicator of the value of the hardware configuration register is the value of the hardware configuration register.

Example 8 may include the subject matter of any of Examples 1-6, and may further specify that the request is a check that a value of the hardware configuration register is equal to a specified value, and the indicator of the value of the hardware configuration register is a binary indicator of whether or not the value of the hardware configuration register is equal to the specified value.

Example 9 may include the subject matter of Example 8, and may further specify that the arbiter logic is a driver execution environment (DXE) script operating in a basic input/output operating system (BIOS) of the processing device.

Example 10 may include the subject matter of any of Examples 1-9, and may further specify that the request service logic is further to determine which of a plurality of drivers has access to the hardware configuration register represented by the request, and to communicate with the determined driver to service the request.

Example 11 may include the subject matter of any of Examples 1-3 and 6-10, and may further specify that the arbiter logic is a basic input/output operating system (BIOS) phase arbiter that executes at boot.

Example 12 may include the subject matter of any of Examples 1-11, and may further specify that the TEE is a system management mode.

Example 13 is a method for hardware configuration arbitration, including: providing, by computing logic, an indication of a request from an application to reporting logic of a trusted execution environment, TEE, of a processing device, wherein: the processing device has the TEE and a non-trusted execution environment, non-TEE, the processing device is to enter the TEE from the non-TEE in response to a particular interrupt, the TEE is executed from a memory not accessible from the non-TEE, the reporting logic is stored in the memory, and the request represents a hardware configuration register; determining, by the computing logic, that an indicator, provided by the reporting logic in response to receipt of the indication of the request, of a value of the hardware configuration register represented by the request does not satisfy a stored security requirement; and performing, by the computing logic, an action in response to the determination that the stored security requirement is not satisfied.

Example 14 may include the subject matter of Example 13, and may further specify that performing an action in response to the determination that the stored security requirement is not satisfied includes causing a display, on a display device, of an indicator that the stored security requirement is not satisfied in response to the determination that the stored security requirement is not satisfied.

Example 15 may include the subject matter of any of Examples 13-14, and may further specify that performing an action in response to the determination that the stored security requirement is not satisfied includes causing hardware associated with the hardware configuration register to shut down in response to the determination that the stored security requirement is not satisfied.

Example 16 may include the subject matter of any of Examples 13-15, and may further specify that the hardware configuration register is a chipset remapping register.

Example 17 may include the subject matter of any of Examples 13-15, and may further specify that the hardware configuration register is a system management mode lock register.

Example 18 may include the subject matter of any of Examples 13-15, and may further specify that the hardware configuration register is a flash part lock register.

Example 19 may include the subject matter of any of Examples 13-18, and may further specify that at least a portion of the computing logic operates in the non-TEE of the processing device.

Example 20 may include the subject matter of any of Examples 13-19, and may further specify that at least a portion of the computing logic operates on a second processing device different from the processing device.

Example 21 may include the subject matter of any of Examples 13-20, and may further specify that at least a portion of the computing logic operates in the TEE of the processing device.

Example 22 may include the subject matter of any of Examples 13-21, and may further specify that the TEE is a system management mode.

Example 23 is one or more machine readable media having instructions thereon which, in response to execution by one or more processing devices of an apparatus, cause the apparatus to perform the method of any of Examples 13-22.

Example 24 is an apparatus for hardware configuration arbitration, including: means for providing an indication of a request from an application to reporting logic of a trusted execution environment, TEE, of a processing device, wherein: the processing device has the TEE and a non-trusted execution environment, non-TEE, the processing device is to enter the TEE from the non-TEE in response to a particular interrupt, the TEE is executed from a memory not accessible from the non-TEE, the reporting logic is stored in the memory, and the request represents a hardware configuration register; means for determining that an indicator, provided by the reporting logic in response to receipt of the indication of the request, of a value of the hardware configuration register represented by the request does not satisfy a stored security requirement; and means for performing an action in response to the determination that the stored security requirement is not satisfied.

Example 25 may include the subject matter of Example 24, and may further specify that the means for performing an action in response to the determination that the stored security requirement is not satisfied includes means for causing a display, on a display device, of an indicator that the stored security requirement is not satisfied in response to the determination that the stored security requirement is not satisfied.

Example 26 may include the subject matter of any of Examples 24-25, and may further specify that the means for performing an action in response to the determination that the stored security requirement is not satisfied includes means for causing hardware associated with the hardware configuration register to shut down in response to the determination that the stored security requirement is not satisfied.

Example 27 may include the subject matter of any of Examples 24-26, and may further specify that the hardware configuration register is a chipset remapping register.

Example 28 may include the subject matter of any of Examples 24-26, and may further specify that the hardware configuration register is a system management mode lock register.

Example 29 may include the subject matter of any of Examples 24-26, and may further specify that the hardware configuration register is a flash part lock register.

Example 30 may include the subject matter of any of Examples 24-29, and may further specify that at least a portion of the apparatus operates in the non-TEE of the processing device.

Example 31 may include the subject matter of any of Examples 24-30, and may further specify that at least a portion of the apparatus operates on a second processing device different from the processing device.

Example 32 may include the subject matter of any of Examples 24-31, and may further specify that at least a portion of the apparatus operates in the TEE of the processing device.

Example 33 may include the subject matter of any of Examples 24-32, and may further specify that the TEE is a system management mode.

Example 34 is an apparatus for hardware configuration arbitration, including: request logic to provide an indication of a request from an application to reporting logic of a TEE of a processing device, wherein: the processing device has the TEE and a non-TEE the processing device is to enter the TEE from the non-TEE in response to a particular interrupt, the TEE is executed from a memory not accessible from the non-TEE, the reporting logic is stored in the memory, and the request represents a hardware configuration register; security logic to determine that an indicator, provided by the reporting logic in response to receipt of the indication of the request, of a value of the hardware configuration register represented by the request does not satisfy a stored security requirement; and action logic to perform an action in response to the determination that the stored security requirement is not satisfied.

Example 35 may include the subject matter of Example 34, and may further specify that perform an action in response to the determination that the stored security requirement is not satisfied includes cause a display, on a display device, of an indicator that the stored security requirement is not satisfied in response to the determination that the stored security requirement is not satisfied.

Example 36 may include the subject matter of any of Examples 34-35, and may further specify that perform an action in response to the determination that the stored security requirement is not satisfied includes cause hardware associated with the hardware configuration register to shut down in response to the determination that the stored security requirement is not satisfied.

Example 37 may include the subject matter of any of Examples 34-36, and may further specify that the hardware configuration register is a chipset remapping register.

Example 38 may include the subject matter of any of Examples 34-36, and may further specify that the hardware configuration register is a system management mode lock register.

Example 39 may include the subject matter of any of Examples 34-36, and may further specify that the hardware configuration register is a flash part lock register.

Example 40 may include the subject matter of any of Examples 34-39, and may further specify that at least a portion of the apparatus operates in the non-TEE of the processing device.

Example 41 may include the subject matter of any of Examples 34-40, and may further specify that at least a portion of the apparatus operates on a second processing device different from the processing device.

Example 42 may include the subject matter of any of Examples 34-41, and may further specify that at least a portion of the apparatus operates in the TEE of the processing device.

Example 43 may include the subject matter of any of Examples 34-42, and may further specify that the TEE is a system management mode.

Example 44 is a method for hardware configuration reporting, including: receiving, by computing logic, an indication of a request from arbiter logic, wherein: the computing logic is stored within a memory to operate within a TEE of a processing device, the processing device has a TEE and a non-TEE, the processing device is to enter the TEE from the non-TEE in response to a particular interrupt, the TEE is executed from the memory, the memory is not accessible from the non-TEE, and the request represents a hardware configuration register; and reporting, by the computing logic, an indicator of a value of the hardware configuration register represented by the request to the arbiter logic.

Example 45 may include the subject matter of Example 44, and may further specify that the indication of the request from the arbiter logic is based at least in part on a value stored in a predetermined register accessible to the processing device when operating in the non-TEE.

Example 46 may include the subject matter of any of Examples 44-45, and may further specify that the indication of the request from the arbiter logic is based at least in part on a source of the particular interrupt that triggered the entry of the processing device into the TEE.

Example 47 may include the subject matter of any of Examples 44-46, and may further specify that the arbiter logic operates in the non-TEE of the processing device.

Example 48 may include the subject matter of any of Examples 44-46, and may further specify that the arbiter logic operates on a second processing device different from the processing device.

Example 49 may include the subject matter of any of Examples 44-46, and may further specify that the arbiter logic operates in the TEE of the processing device.

Example 50 may include the subject matter of any of Examples 44-49, and may further specify that the request is a query of a value of the hardware configuration register, and the indicator of the value of the hardware configuration register is the value of the hardware configuration register.

Example 51 may include the subject matter of any of Examples 44-49, and may further specify that the request is a check that a value of the hardware configuration register is equal to a specified value, and the indicator of the value of the hardware configuration register is a binary indicator of whether or not the value of the hardware configuration register is equal to the specified value.

Example 52 may include the subject matter of Example 51, and may further specify that the arbiter logic is a driver execution environment (DXE) script operating in a basic input/output operating system (BIOS) of the processing device.

Example 53 may include the subject matter of any of Examples 44-52, and may further include determining, by the computing logic, which of a plurality of drivers has access to the hardware configuration register represented by the request, and to communicate with the determined driver to service the request.

Example 54 may include the subject matter of any of Examples 44-46 and 49-53, and may further specify that the arbiter logic is a basic input/output operating system (BIOS) phase arbiter that executes at boot.

Example 55 may include the subject matter of any of Examples 44-54, and may further specify that the TEE is a system management mode.

Example 56 is an apparatus for hardware configuration reporting, including: means for receiving an indication of a request from arbiter logic, wherein: the means for receiving is stored within a memory to operate within a TEE of a processing device, the processing device has a TEE and a non-TEE, the processing device is to enter the TEE from the non-TEE in response to a particular interrupt, the TEE is executed from the memory, the memory is not accessible from the non-TEE, and the request represents a hardware configuration register; and means for reporting an indicator of a value of the hardware configuration register represented by the request to the arbiter logic, wherein the means for receiving is stored within the memory to operate within the TEE of the processing device.

Example 57 may include the subject matter of Example 56, and may further specify that the indication of the request from the arbiter logic is based at least in part on a value stored in a predetermined register accessible to the processing device when operating in the non-TEE.

Example 58 may include the subject matter of any of Examples 56-57, and may further specify that the indication of the request from the arbiter logic is based at least in part on a source of the particular interrupt that triggered the entry of the processing device into the TEE.

Example 59 may include the subject matter of any of Examples 56-58, and may further specify that the arbiter logic operates in the non-TEE of the processing device.

Example 60 may include the subject matter of any of Examples 56-58, and may further specify that the arbiter logic operates on a second processing device different from the processing device.

Example 61 may include the subject matter of any of Examples 56-58, and may further specify that the arbiter logic operates in the TEE of the processing device.

Example 62 may include the subject matter of any of Examples 56-61, and may further specify that the request is a query of a value of the hardware configuration register, and the indicator of the value of the hardware configuration register is the value of the hardware configuration register.

Example 63 may include the subject matter of any of Examples 56-61, and may further specify that the request is a check that a value of the hardware configuration register is equal to a specified value, and the indicator of the value of the hardware configuration register is a binary indicator of whether or not the value of the hardware configuration register is equal to the specified value.

Example 64 may include the subject matter of Example 63, and may further specify that the arbiter logic is a driver execution environment (DXE) script operating in a basic input/output operating system (BIOS) of the processing device.

Example 65 may include the subject matter of any of Examples 56-64, and may further include means for determining which of a plurality of drivers has access to the hardware configuration register represented by the request, and means for communicating with the determined driver to service the request, wherein the means for determining and the means for communicating are stored within the memory to operate within the TEE of the processing device.

Example 66 may include the subject matter of any of Examples 56-58 and 61-65, and may further specify that the arbiter logic is a basic input/output operating system (BIOS) phase arbiter that executes at boot.

Example 67 may include the subject matter of any of Examples 56-66, and may further specify that the TEE is a system management mode.

Example 68 is one or more machine readable media having instructions thereon which, in response to execution by one or more processing devices of an apparatus, cause the apparatus to perform the method of any of Examples 44-55.

What is claimed is:

1. An apparatus for hardware configuration reporting, comprising:
    a processing device having a trusted execution environment, TEE, and a non-trusted execution environment, non-TEE, wherein the processing device is to enter the TEE from the non-TEE in response to a particular interrupt;
    an isolated memory, not accessible from the non-TEE, from which the TEE is executed,
    request service logic, stored in the isolated memory, to operate within the TEE to receive an indication of a request from arbiter logic, stored in the non-TEE, wherein the request represents a hardware configuration register; and
    reporting logic, stored in the isolated memory, to operate within the TEE and to report an indicator of a value of the hardware configuration register represented by the request to the arbiter logic;
    wherein the arbiter logic is authorized to shut down hardware associated with the hardware configuration register based, at least in part, on the value of the hardware configuration register reported.

2. The apparatus of claim 1, wherein the indication of the request from the arbiter logic is based at least in part on a value stored in a predetermined register accessible to the processing device when operating in the non-TEE.

3. The apparatus of claim 1, wherein the indication of the request from the arbiter logic is based at least in part on a source of the particular interrupt that triggered the entry of the processing device into the TEE.

4. The apparatus of claim 1, wherein the arbiter logic operates in the non-TEE of the processing device.

5. The apparatus of claim 1, wherein the arbiter logic operates on a second processing device different from the processing device.

6. The apparatus of claim 1, wherein the TEE comprises an execution environment under a system management mode (SMM) of the processing device.

7. The apparatus of claim 1, wherein the request is a query of a value of the hardware configuration register, and the indicator of the value of the hardware configuration register is the value of the hardware configuration register.

8. The apparatus of claim 1, wherein the request is a check that a value of the hardware configuration register is equal to a specified value, and the indicator of the value of the hardware configuration register is a binary indicator of whether or not the value of the hardware configuration register is equal to the specified value.

9. The apparatus of claim 8, wherein the arbiter logic is a driver execution environment (DXE) script operating in a basic input/output operating system (BIOS) of the processing device.

10. One or more non-transitory machine readable media having instructions thereon which, in response to execution by one or more processing devices of an apparatus, cause the apparatus to: receive an indication of a request from arbiter logic, wherein: the one or more machine readable media is stored within an isolated memory to operate within a trusted execution environment (TEE) of a processing device, the processing device has the TEE and a non-trusted execution environment (non-TEE), and the arbiter logic is stored in the non-TEE, the processing device is to enter the TEE from the non-TEE in response to a particular interrupt, the TEE is executed from the isolated memory, the isolated memory is not accessible from the non-TEE, and the request represents a hardware configuration register; report an indicator of a value of the hardware configuration register represented by the request to the arbiter logic; and shut down hardware associated with the hardware configuration register based, at least in part, on the value of the hardware configuration register reported.

11. The one or more non-transitory machine readable media of claim 10, further having instructions thereon which, in response to execution by one or more processing devices of an apparatus, cause the apparatus to determine which of a plurality of drivers has access to the hardware configuration register represented by the request, and to communicate with the determined driver to service the request.

12. The one or more non-transitory machine readable media of claim 10, wherein the arbiter logic is a basic input/output operating system (BIOS) phase arbiter that executes at boot.

13. The one or more non-transitory machine readable media of claim 10, wherein the TEE is a system management mode.

14. An apparatus for hardware configuration arbitration, comprising:
    arbiter logic to provide an indication of a request from an application to reporting logic of a TEE of a processing device, wherein:
    the processing device has the TEE and a non-TEE, the processing device is to enter the TEE from the non-TEE in response to a particular interrupt, the TEE is executed from an isolated memory not accessible from the non-TEE, the reporting logic is stored in the isolated memory, the arbiter logic is stored in the non-TEE, and the request represents a hardware configuration register;
    security logic to determine that an indicator, provided by the reporting logic in response to receipt of the indication of the request, of a value of the hardware configuration register represented by the request does not satisfy a stored security requirement; and
    action logic to shut down hardware associated with the hardware configuration register, at least in part in response to the determination that the stored security requirement is not satisfied.

15. The apparatus of claim 14, wherein at least a portion of the apparatus operates in the non-TEE of the processing device.

16. The apparatus of claim 14, wherein at least a portion of the apparatus operates on a second processing device different from the processing device.

17. The apparatus of claim 14, wherein at least a portion of the apparatus operates in the TEE of the processing device.

18. One or more non-transitory machine readable media having instructions thereon which, in response to execution by one or more processing devices of an apparatus, cause the apparatus to:

provide an indication of a request from an application to reporting logic of a trusted execution environment, TEE, of a processing device, wherein:

the processing device has the TEE and a non-trusted execution environment, non-TEE, the application runs in the non-TEE, the processing device is to enter the TEE from the non-TEE in response to a particular interrupt, the TEE is executed from an isolated memory not accessible from the non-TEE, the reporting logic is stored in the isolated memory, and the request represents a hardware configuration register;

determine that an indicator, provided by the reporting logic in response to receipt of the indication of the request, of a value of the hardware configuration register represented by the request does not satisfy a stored security requirement; and shut down hardware associated with the hardware configuration register at least in part in response to the determination that the stored security requirement is not satisfied.

19. The one or more non-transitory machine readable media of claim 18, wherein the TEE is a system management mode.

20. The one or more non-transitory machine readable media of claim 18, wherein perform an action in response to the determination that the stored security requirement is not satisfied includes cause a display, on a display device, of an indicator that the stored security requirement is not satisfied in response to the determination that the stored security requirement is not satisfied.

21. The one or more non-transitory machine readable media of claim 18, wherein perform an action in response to the determination that the stored security requirement is not satisfied includes cause hardware associated with the hardware configuration register to shut down in response to the determination that the stored security requirement is not satisfied.

22. The one or more non-transitory machine readable media of claim 18, wherein the hardware configuration register is a chipset remapping register.

23. The one or more non-transitory machine readable media of claim 18, wherein the hardware configuration register is a system management mode lock register.

24. The one or more non-transitory machine readable media of claim 18, wherein the hardware configuration register is a flash part lock register.

* * * * *